United States Patent
Horner et al.

(10) Patent No.: US 9,532,233 B2
(45) Date of Patent: *Dec. 27, 2016

(54) SYSTEM AND METHOD FOR CONDUCTING WIRELESS SITE SURVEYS

(71) Applicant: XIRRUS, INC., Thousand Oaks, CA (US)

(72) Inventors: Jack Michael Horner, Thousand Oaks, CA (US); Dirk Ion Gates, Westlake Village, CA (US); Kurt Karl Sauter, Thousand Oaks, CA (US); Bruce Anthony Miller, Porter Ranch, CA (US); Alexander Chernyakhovsky, Los Angeles, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,213

(22) Filed: Oct. 21, 2014

(65) Prior Publication Data
US 2015/0105087 A1 Apr. 16, 2015

Related U.S. Application Data

(63) Continuation of application No. 13/222,570, filed on Aug. 31, 2011, now Pat. No. 8,868,002.

(51) Int. Cl.
*H04B 17/00* (2015.01)
*H04W 16/18* (2009.01)
*H04W 24/08* (2009.01)

(52) U.S. Cl.
CPC .......... *H04W 16/18* (2013.01); *H04W 24/08* (2013.01)

(58) Field of Classification Search
CPC ...... H04W 16/18; H04W 24/08; H04W 16/14; H04W 24/00; H04W 24/06; H04W 48/06; H04W 52/343; H04W 84/042; H04W 88/02; H04W 88/08; H04L 12/2697; H04L 43/50
USPC ............... 455/67.11, 67.13, 67.14, 67.7, 446
See application file for complete search history.

(56) References Cited

U.S. PATENT DOCUMENTS

| | | | | |
|---|---|---|---|---|
| 7,193,562 B2 * | 3/2007 | Shtrom | ..................... | H01Q 1/38 343/700 MS |
| 7,689,252 B2 * | 3/2010 | Nishida | ..................... | H04L 9/32 370/339 |
| 8,200,239 B2 * | 6/2012 | Mia et al. | ................... | 455/456.1 |
| 2002/0002046 A1 * | 1/2002 | Okanoue et al. | ............. | 455/423 |
| 2007/0066234 A1 * | 3/2007 | Lastinger et al. | ......... | 455/67.11 |
| 2008/0200181 A1 * | 8/2008 | Zill et al. | ................... | 455/456.1 |
| 2011/0090123 A1 * | 4/2011 | Sridhara et al. | .............. | 342/450 |
| 2013/0009821 A1 * | 1/2013 | Steer | ........................ | G01S 5/04 342/417 |

(Continued)

*Primary Examiner* — Edward Urban
*Assistant Examiner* — Max Mathew
(74) *Attorney, Agent, or Firm* — SoCal IP Law Group LLP; Steven C. Sereboff; John E. Gunther

(57) ABSTRACT

A method for surveying a site for installation of wireless access points is provided. A map of the site under survey is displayed. User input relating to the position of a first wireless device at the site is received. User input relating to the position of a second wireless device at the site is also received. Wireless signals broadcast by the second wireless device are measured using the first wireless device to obtain signal strength values corresponding to the strength of the wireless signals. Attenuation values based on the signal strength values are calculated and assigned to features on the map of the site under survey.

9 Claims, 4 Drawing Sheets

(56) References Cited

U.S. PATENT DOCUMENTS

2013/0023283 A1\* 1/2013 Chakravarty ......... G01S 5/0252
                                                        455/456.1

\* cited by examiner

SYSTEM AND METHOD FOR CONDUCTING WIRELESS SITE SURVEYS

This application is a continuation of U.S. patent application Ser. No. 13/222,570, filed on Aug. 31, 2011, titled "System and Method for Conducting Wireless Site Surveys," issued as U.S. Pat. No. 8,868,002 on Oct. 21, 2014, which application is hereby incorporated herein in its entirety.

FIELD OF THE INVENTION

This invention relates to wireless networking and more particularly to determining installation locations for wireless access points.

BACKGROUND

Designing wireless networks that provide adequate network quality in an operating environment (e.g., an office building) is a non-trivial task. Environmental factors can affect the propagation of radio frequency (RF) waves. For example, walls, doors, windows, and the like can reflect, refract, and attenuate RF waves in ways that may be difficult to predict.

As a result, the operating environment a wireless network is deployed in is a significant variable to consider when designing the wireless network for that environment. The quality of the wireless network may depend on, for example, the number of wireless access points deployed and their respective installation locations.

There are various approaches to designing wireless networks for an environment that consider the propagation of RF waves through the environment.

One approach is a predictive survey in which a wireless network designer predicts how the RF waves will propagate through the environment. For a predictive survey, a designer may simply estimate the maximum range of a wireless access point from an installation location in the environment and provide enough wireless access points to cover the operating environment based on the maximum expected range. The designer may also consider a map of the operating environment and estimate the attenuation expected from structural elements in the environment such as, for example, cement, wood, drywall, etc. Each structural material may be correspond to an expected attenuation value that the designer may consider when estimating the coverage pattern for the wireless access points.

In either case, the designer may not take live measurements within the operating environment for a predictive survey. Instead, the network design is based on the estimations and predictions of the network designer. This approach can be prone to inaccuracies as the estimated range for and attenuation of the RF waves may deviate from the actual range and attenuation. Inaccuracies may thus lead to too many or too few access points and can result in costly revisions to the network design.

Another approach to wireless network design involves live site surveys by professional network designers. During a live site survey, a professional designer installs a wireless access point in the operating environment and measures the signal strength of the access point multiple times to generate a coverage pattern for the wireless access point. Based on the coverage pattern, the professional network designer may determine whether the access point should be moved or whether additional access points are needed to provide adequate coverage and network quality. A live site survey may require multiple iterations before the professional network designer can identify the optimal locations for the wireless access points. This trial-and-error approach may be time consuming when designing networks for large buildings. Furthermore, while a live site survey can produce accurate results, a live site survey may not be a cost-effective approach due to the involvement of professional network designers.

Therefore, a need exists for an accurate and cost-effective approach to designing wireless networks for heterogeneous operating environments.

SUMMARY

A method for surveying a site for installation of wireless access points is provided. A map of the site under survey is displayed. User input relating to the position of a first wireless device at the site is received. User input relating to the position of a second wireless device at the site is also received. Wireless signals broadcast by the second wireless device are measured using the first wireless device to obtain signal strength values corresponding to the strength of the wireless signals. Attenuation values based on the signal strength values are calculated and assigned to features on the map of the site under survey.

A system or determining attenuation of wireless signals broadcast by a wireless device at a wireless survey site is also provided. A map display module displays a map of the site under survey. A signal strength measurement module measures wireless signals broadcast by the wireless device to obtain signal strength measurement values that correspond to the strength of the wireless signals. An attenuation calculation module calculates attenuation values based on the signal strength values and based on user input. The user input respectively relates to a measurement location and the position of the wireless device at the site under survey. The attenuation values are assignable to at least one feature on the map of the site under survey.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A system and method for conducting wireless site surveys is disclosed. Systematic measurements of propagation of RF waves (i.e., wireless communication signals) through an operating environment are performed to measure the attenuation of the wireless signals in the operating environment. Based on the measurements obtained, attenuation values may be assigned to physical structures in or particular areas of the operating environment, and a site profile may be generated that includes the attenuation values. The user may then analyze the site profile to determine, for example, how many wireless access points are needed to provide adequate coverage and network quality for the operating environment as well as the optimal installation locations for the wireless access points in the environment. Additionally, a user may transmit the site profile to a professional network designer, and the professional network designer may advantageously design the wireless network remotely without visiting the site.

Figure 1:
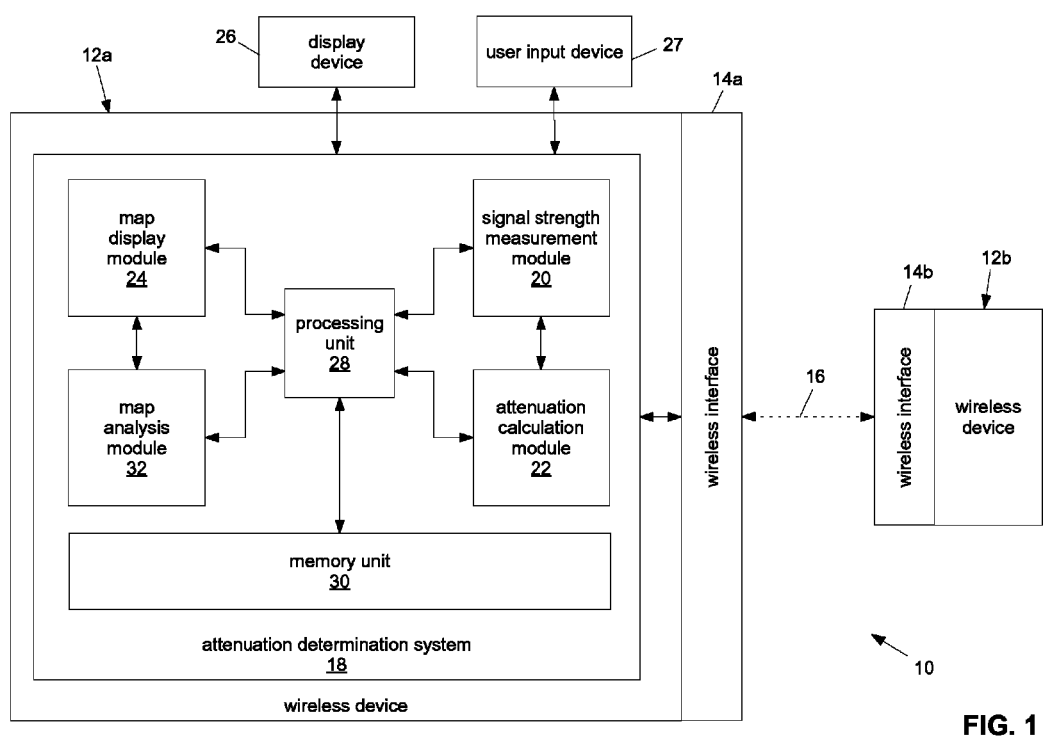
FIG. 1 is a block diagram of an example of an implementation of a system for conducting wireless site surveys.

Referring to FIG. 1, a block diagram of an example of an implementation of a system 10 for conducting wireless site surveys is shown. As seen in FIG. 1, the system 10 includes a pair of wireless devices 12a and 12b. Each wireless device 12a and 12b includes a wireless interface 14a and 14b and is configured for exchanging wireless communications 16 such as, for example, IEEE 802.11-based wireless signals. In this example, at least one of the wireless devices is a wireless measurement device 12a configured to measure wireless signals 16, and at least one of the wireless devices is a wireless broadcast device 12b configured to transmit wireless signals 16. The wireless measurement device 12a includes an attenuation determination system 18 and may be for example, implemented in a desktop computer, a laptop computer, a tablet computer, a hand-held computer, a mobile telephone, or any other computing device configurable to include the attenuation determination system 18. The wireless broadcast device 12b may be, for example, a wireless access point that includes a wireless transceiver used to exchange wireless communication signals and provide wireless access to a data network such as, for example, an Ethernet network or the Internet. The wireless broadcast device 12b may also be, for example, a wireless tag that broadcasts a wireless signal. The wireless broadcast device 12b may also be another computing device that includes its own respective attenuation determination system 18.

Accordingly, in one example implementation, the pair of wireless devices 12a and 12b may include a wireless measurement device 12a and an access point 12b. In another example implementation, each wireless device in the pair of wireless devices 12a and 12b may serve as both a wireless measurement device as well as a wireless broadcast device. In other words, each wireless device 12a and 12b, in this second example implementation, may be a computing device that includes a respective attenuation determination system 18 to measure wireless signals broadcast from the corresponding wireless device.

The attenuation determination system 18 measures wireless signals 16 broadcast from the corresponding wireless device 12b and determines the attenuation of wireless signals in the operating environment. The attenuation determination system 18, in this example, includes the following modules: a signal strength determination module 20 that measures the signal strength of wireless signals 16 received at the wireless interface 14a of the computing device 12a; an attenuation calculation module 22 that calculates the actual attenuation of the received wireless signals 16; and a map display module 24 that presents a map of the operating environment on a display device 26. The attenuation determination system may also include a map analysis module 32 that analyzes a map image of the operating environment and automatically assigns calculated attenuation values to features in the map image that correspond to physical structures or particular areas in the operating environment. Additionally, the attenuation determination system 18, in this example, includes a processing unit 28 in signal communication with the modules 20, 22, 24, and 32. The processing unit 28 executes instructions relating to the functions relating to performing a wireless site survey. The processing unit 28, in this example, is also in signal communication with a memory unit 30. The processing unit 28 may store at and retrieve data from the memory unit 30 that relates to the wireless site survey.

The attenuation determination system 18 may present a user interface (not shown) at the display device 26 for receiving user input relating to the wireless site survey. User input may be received at one or more user input devices 27 in signal communication with the wireless device 12a. The user input controls 27 may include, for example, a keyboard, a keypad, a pointing device (joystick, stylus, mouse, touchpad, touchscreen, trackball, and the like), and other input devices suitable for providing user input to the attenuation determination system 18.

A user may use the attenuation determination system 18 to create an attenuation profile for a wireless environment. The user may take measurements of wireless signal strengths at multiple locations in the wireless environment. The user may start at a location next to the wireless broadcast device 12b to take an initial baseline signal strength measurement and then move away from the wireless broadcast device to take additional signal strength measurements at additional locations in the wireless environment. The signal strength measurements may be used to calculate the expected attenuation, relative attenuation, and additional attenuation values for the wireless environment and the measurement locations. The user may then use the attenuation determination system 18 to create the attenuation profile for the wireless environment based on the determined attenuation values.

A user may use the attenuation determination system 18 of the wireless measurement device 12a to systematically measure the signal strength of wireless signals 16 in the operating environment. The signal strength measurement module 20 of the attenuation determination system 18 measures the wireless signals 16 transmitted by the wireless broadcast device 12b. The signal strength measurement module 20 may measure the strength of wireless signals 16 by, for example, measuring the strength of packets transmitted by the wireless broadcast device 12b. The signal strength measurement module 20 may then assign a corresponding signal strength value to the measured wireless signals 16. For example, the signal strength measurement module 20 may assign a received signal strength indication (RSSI) value to the measured wireless signals 16. An RSSI value is a measurement of the power present in a received radio signal.

The signal strength measurement module 20 may measure both a baseline signal strength ($STR_{baseline}$) and a perceived signal strength ($STR_{perceived}$) when the wireless measurement device 12a is in signal communication with the wireless broadcast device 12b. The wireless measurement device 12a is in signal communication with the wireless broadcast device 12b when the wireless broadcast device transmits wireless signals 16 within range of the wireless measurement device such that the wireless measurement device can hear (i.e., receive the transmitted wireless signals from) the wireless broadcast device. Baseline signal strength refers to the strength of wireless signals 16 transmitted by the wireless broadcast device 12b when the wireless measurement device 12a is positioned near the wireless broadcast device at a distance of, for example, around one meter with no obstructions between the wireless measurement device and the wireless broadcast device. In some example implementations, the baseline signal strength value may be determined by taking the average of multiple baseline signal strength measurements. Perceived signal strength refers to the strength of wireless signals 16 received at the wireless measurement device 12a from the wireless broadcast device 12b when the wireless measurement device and the wireless broadcast device are positioned at various locations throughout the wireless environment for which there may be obstructions between the wireless measurement device and the wireless broadcast device.

The wireless measurement device 12a may take measurements of the baseline signal strength and the perceived signal strengths when the wireless measurement device is associated to the wireless broadcast device 12b as well as when the wireless measurement device is not associated to the wireless broadcast device. The wireless measurement device 12a may be associated with the wireless broadcast device 12b when, for example, the wireless measurement device has been authenticated via, e.g., a password. The wireless measurement device 12a may be in signal communication with the wireless broadcast device 12b but not associated with the wireless broadcast device if the wireless measurement device has not been authenticated. The wireless measurement device 12a, in some example implementations, may take measurements of the perceived signal strengths in the same associative state used for taking measurements of the baseline signal strength. In other words, if the wireless measurement device 12a measures the baseline signal strength while associated with the wireless measurement device 12b, then the wireless measurement device may measure the perceived signal strength while associated with the wireless broadcast device. Likewise, if the wireless measurement device 12a measures the baseline signal strength while not associated with the wireless measurement device 12b, then the wireless measurement device may measure the perceived signal strength while not associated to the wireless broadcast device. In addition, the wireless broadcast device may be ESS-based (extended basic service set) or IBSS-based (independent basic service set).

In some implementations, the wireless broadcast device 12b may broadcast more than one SSID (service set identifier). The SSIDs broadcast by the wireless broadcast device 12b respectively may correspond to more than one wireless network. Accordingly, the user interface may receive user input relating to a selection of a desired SSID to measure signal strength on. The wireless measurement device 12a may associate with the selected SSID of the wireless broadcast device 12b and measure the signal strength of wireless signals 16 transmitted by the wireless broadcast device for the selected SSID.

When the user has gathered a desired amount of signal strength measurements, the attenuation determination system may calculate the attenuation for the measurement locations at the wireless environment. Based on the baseline signal strength, $STR_{baseline}$, and the respective perceived signal strengths, $STR_{perceived}$, for the measurement locations at the wireless environment, the attenuation calculation module 22 may calculate the attenuation of the wireless signals 16 for the measurement locations. The attenuation calculation module 22, in this example, calculates the expected attenuation ($ATT_{expected}$) between the wireless devices 12a and 12b, the relative attenuation ($ATT_{relative}$) between the wireless devices, and the additional attenuation ($ATT_{additional}$) between the wireless devices.

The expected attenuation between the wireless devices 12a and 12b refers to the free space path loss in signal strength that typically results from the propagation of a wireless signal through an unobstructed space (e.g., air). The attenuation calculation module 22 may determine the expected attenuation, $ATT_{expected}$, using a free space path loss formula. A suitable formula to calculate free space path loss and the expected attenuation, in this example, may be:

$$ATT_{expected} = L_{ref} + 10 \log(D^n) + S \qquad (1)$$

where $ATT_{expected}$ is the expected attenuation (i.e., free space path loss) in decibels (dB); $L_{ref}$ is a reference path loss in decibels corresponding to a one meter distance between the wireless devices 12a and 12b; D is the actual distance between the wireless devices; n is a path loss exponent for the operating environment; and S is the degree of shadow fading in decibels for the operating environment. The value for the path loss exponent, n, depends on, for example, the frequency of the wireless signals, the type of wireless environment, and the amount of obstructions in the wireless environment. For example, for wireless signals transmitted at 2.4 GHz (gigahertz), typical path loss exponent values include: n=2 for an open wireless environment free of obstructions; n=3.3 for a moderately dense indoor office environment; and n=4.5 for a relatively more dense home environment. The shadow fading factor, S, also depends on the type of environment and the amount of obstructions in the wireless environment. For example, an indoor wireless environment having a relatively moderate amount of obstructions, a shadow fading factor of around 7 dB may be used. In some example implementations, the perceived signal strength measurement values may be interpolated to approximate the values of the path loss exponent, n, and the shadow fading factor, S, for the wireless environment. The approximated path loss exponent, n, and shadow fading factor, S, may then be used in the formula (1) above to calculate the expected attenuation, $ATT_{expected}$.

The relative attenuation between the wireless devices 12a and 12b refers to the difference between the baseline signal strength ($STR_{baseline}$) and the perceived signal strength ($STR_{perceived}$). Accordingly, the attenuation calculation module 22 may calculate the relative attenuation, $ATT_{relative}$, by subtracting the perceived signal strength from the baseline signal strength:

$$ATT_{relative} = STR_{baseline} - STR_{perceived} \qquad (2)$$

Theoretically, the relative attenuation, $ATT_{relative}$, will be greater than the expected attenuation, $ATT_{expected}$, since the relative attenuation includes both the free space path loss as well as additional attenuation caused by physical structures in the operating environment. Accordingly, the attenuation calculation module 22 may determine the additional attenuation, $ATT_{additional}$, attributable to the physical structures in the operating environment by subtracting the expected attenuation, $ATT_{expected}$, from the relative attenuation, $ATT_{relative}$:

$$ATT_{additional} = ATT_{relative} - ATT_{expected} \qquad (3)$$

The resulting additional attenuation, $ATT_{additional}$, may be attributable to and thus assigned to one or more physical structures between the wireless devices 12a and 12b in the operating environment. Once the attenuation calculation module 22 has calculated the additional attenuation attributable to the physical structures in the operating environment, the additional attenuation may be assigned to the physical structures in the operating environment that cause the additional attenuation. As discussed further below, the attenuation values may alternatively be assigned, for example, to the respective measurement locations at which the signal strength measurements were taken.

The map display module 24 of the attenuation determination system 18 presents a map of the operating environment at a user interface (not shown) on a display device 26. The map may be, for example, a floor plan of the operating environment. The map may include various features depicting the layout of the operating environment including physical structures in the operating environment or different areas of the operating environment. Physical structures may include, for example, walls, doors, windows, cubicles, desks, file cabinets, etc. The map image may include features that correspond to these physical structures as, for example, boxes, lines, graphic icons or images, and the like. In this example, the map is scaled in order to determine the actual distance, D, between the wireless measurement device 12a and the wireless broadcast device 12b based on a corresponding distance in the map.

The user interface may receive user input relating to various aspects of the wireless site survey. For example, the user interface may receive user input relating to a user-specified map scale for the map that scales actual distance in the operating environment to a corresponding distance in the map image. In this way, the attenuation calculation module 22 may convert the distance between wireless devices 12a and 12b on the map image to the actual distance between the wireless devices in the operating environment. The attenuation calculation module 22 may use the actual distance when calculating the expected attenuation between the wireless devices 12a and 12b. A user may select two points in the map image and input the actual distance between those two points; the attenuation determination system 18 may then calculate a map image scale based on the provided distance and the distance between the two selected points in the map image. Additionally or alternatively, the user may input the dimensions of the operating environment, and the attenuation determination system 18 may calculate a map image scale based on the dimensions of the operating environment and the dimensions of the map image file. It will be understood that other approaches suitable for receiving information regarding the map image scale may selectively be employed.

The user may also indicate the respective locations of the wireless devices in the operating environment. The indicted locations may be defined by, for example, a pair of x-y coordinates that correspond to an x-y coordinate system for the map image. The memory unit 30 of the attenuation determination system 18 may store the x-y coordinates for the locations of the wireless devices 12a and 12b indicated on the map. Further, the attenuation calculation module 22 may determine the actual distance between the wireless devices based on the location information for each of the wireless devices as discussed above.

Features in the map image may correspond to physical structures or particular areas in the operating environment. Features in the map image that correspond to physical structures in the operating environment may intersect the path between the locations of the wireless devices 12a and 12b on the map image. The additional attenuation observed may thus be assigned to the features in the map image between the wireless devices 12a and 12b. The user interface may receive user input via one or more of the user input devices 27 that indicates which features in the map image intersect the path between the locations of the wireless devices 12a and 12b on the map image. The additional attenuation calculated for the measurement locations may thus be assigned to the features identified as intersecting the path between the wireless devices 12a and 12b.

The attenuation determination system 18 may store data structures in the memory unit 30 that include information relating to, for example: the location of the wireless measurement device 12a; the location of the wireless broadcast device 12b, the baseline signal strength observed; the perceived signal strength observed; the calculated expected attenuation; and the calculated relative attenuation. Once a site survey has measured signal strength at a sufficient number of locations in the operating environment, the attenuation calculation module 22 may analyze the data to calculate the additional attenuation observed. The attenuation determination system 18 may then also store in the data structures at the memory unit 30 information relating to the features between the wireless devices and the additional attenuation observed. The attenuation determination system 18 may assign the additional attenuation to the respective data structures between a wireless broadcast device 12b and a wireless measurement device 12a at a measurement location.

Where one or more features in the map image intersect the path between the wireless devices on the map image, the attenuation determination system 18 may equally distribute the calculated additional attenuation among those features. Some users may choose, however, to take signal strength measurements such that only one feature is between the wireless devices 12a and 12b at a given measurement location. As an alternative to assigning additional attenuation to specific features in the image map, the attenuation determination system 18 may assign attenuation values to particular areas in the map image. For example, the attenuation determination system 18 may divide the map image into a grid and assign an additional attenuation value to each cell of the grid. Other approaches for determining an attenuation profile for an operating environment using the attenuation determination system 18 may selectively be employed.

The attenuation values may be quantified and stored in the memory unit 30 as a decibel value, e.g., −28 dB. The attenuation value may be calculated at any point during the wireless site survey. For example, the attenuation values for a measurement location may be calculated after the perceived signal strength is measured at a measurement location or after the perceived signal strengths are measured for all measurement locations. In other example implementations, the baseline signal strength and perceived signal strengths for the measurement locations may be stored and the attenuation values calculated at a later time.

The measurement locations may be stored in the memory unit as x-y coordinates relative to the map image as discussed above. Likewise, the features in the map image and the cells of the grid for the map image may be defined by a set of x-y coordinates that define the edges and vertices for the shapes of the features. The map image may be an image file also stored at the memory unit 30 of the attenuation determination system. The map image may be obtained from the owner, operator, or managing entity of the operating environment; alternatively, the map image may be created by a user of the attenuation determination system 18.

As discussed above, the user interface may receive user input that indicates which features intersect the path between the locations for the wireless devices 12a and 12b in the map image. Alternatively, the attenuation determination system may also include a map analysis module 32 as shown by way of example in FIG. 1. The map analysis module 32 analyzes the map image and automatically identifies features in the map image that correspond to physical structures in the operating environment, e.g., walls, doors, cubicles, etc. The map analysis module 32 may then automatically determine which features in the map image intersect the path between the locations of the wireless devices 12a and 12b specified during the wireless site survey.

The map analysis module 32 may automatically identify features in the map image (e.g., lines, boxes, and graphic icons or images) through an analysis of the pixel values in the map image. The map analysis module 32 may determine an average pixel value—e.g., an average red-green-blue (RGB) pixel value—for the entire map image. The map analysis module 32 may then compare each pixel in the map image to the average pixel value. If the pixel value for a pixel in the map image exceeds the average pixel value, then the map analysis module 32 may indicate that the pixel is part of a feature in the map image. Once the map analysis module 32 has determined which pixels in the map image correspond to features in the map image, the map analysis module may automatically determine when a feature intersects the path between the locations for the wireless devices 12a and 12b in the map image.

The attenuation determination system 18 described above may be used to conduct a wireless survey of a site and develop an attenuation profile for that site. In one example approach, the site survey may measure the attenuation that results from particular physical structures in the operating environment of the site and assign an additional attenuation value to those structures. A user at the site conducting the wireless site survey, in this example, may iteratively position the wireless devices 12a and 12b on opposite sides of various physical structures at the site and measure the signal strength of wireless signals 16 transmitted from the wireless broadcast device 12b. The attenuation calculation module 22 of the attenuation determination system 18 may calculate the additional attenuation of the wireless signals 16 that can be attributed to that physical structure. A user may measure the signal strength of wireless signals in this way for one or more physical structures at the site under survey. To compile a comprehensive set of data relating to the attenuation across the entire site, the user may systematically obtain measurements for each physical structure at the site under survey, e.g., each door, each wall, each cubicle, etc. It will be understood that the number and selection of measurement locations is at the discretion of the user. Enough measurements should be taken to generate an attenuation profile that covers the area where wireless service is desired. When the user has taken a sufficient amount of measurements, the attenuation determination system 18 may analyze the data to determine the additional attenuation and assign additional attenuation values to the features in the map image that correspond to physical structures in or particular areas of the operating environment of the site.

In another example approach, the site may be divided into a grid, and the user may measure the attenuation of the wireless signals 16 at each cell of the grid. In this second example approach, the user may iteratively position the wireless measurement device 12a in various areas of the site that correspond to cells in the grid. The user may position the wireless broadcast device 12b at a broadcast location corresponding to one of the grid cells and position the wireless measurement device 12a at a measurement location corresponding to another cell of the grid. After the signal strength at the measurement location has been measured, the user may move the wireless measurement device 12a, the wireless broadcast device 12b, or both to a new location corresponding to a different cell of the grid. The accuracy of the attenuation profile for the wireless environment may depend on, for example, the number and distribution of measurement locations and the number of perceived signal strength measurements collected. Well-distributed measurement locations and a high number of signal strength measurements may result in a more accurate attenuation profile. Once the user has obtained signal strength measurements at a desired number of measurement locations, the attenuation determination system 18 may analyze the data to determine the additional attenuation that results in each area of the site and respectively assign additional attenuation values to each of the cells in the grid.

Figure 2:
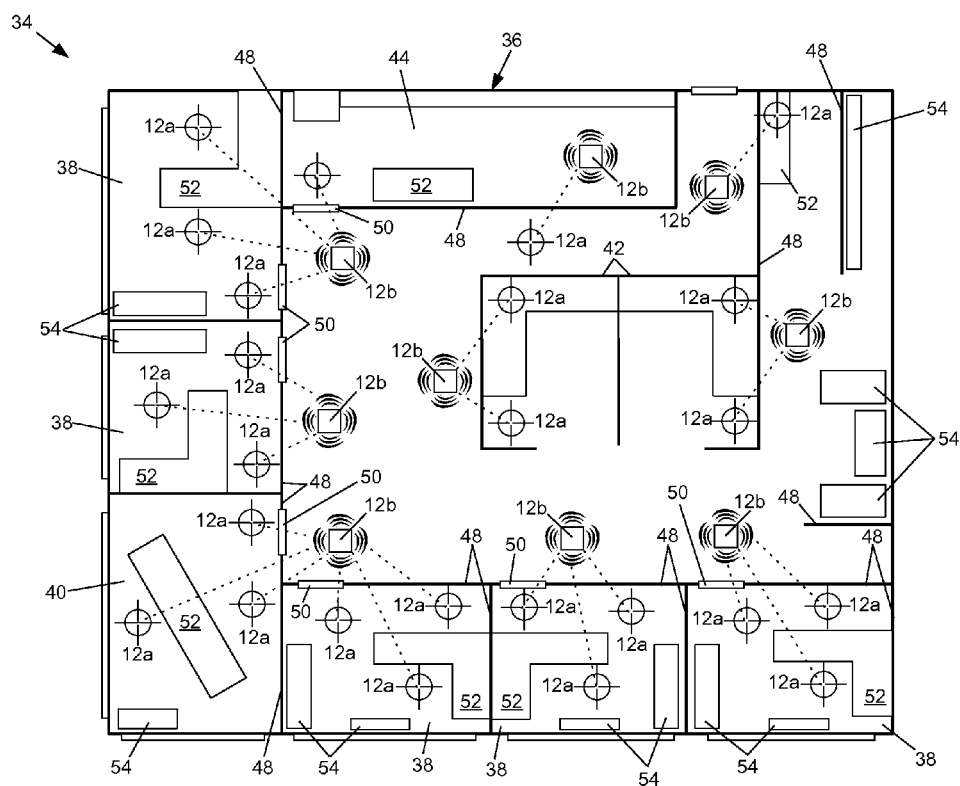
FIG. 2 is an example map image of an example wireless survey site illustrating a first example approach to conducting a wireless site survey.

Referring to FIG. 2, an example map image 34 of an example wireless survey site 36 is shown that illustrates the systematic measurement of attenuation caused by physical structures in the operating environment of the site. The map image 34, in this example, is a floor plan for a medium-sized office space having five enclosed offices 38, one conference room 40, two cubicles 42, a kitchen 44, and a reception area 46. The features in the map image that correspond to physical structures in the operating environment of the survey site include representations for walls 48, doors 50, desks 52, and file cabinets 54.

The additional attenuation attributable to the physical structures 48-54 in the operating environment of the survey site 36 may be determined by positioning the wireless devices 12a and 12b at various locations around the survey site and measuring the signal strength of wireless signals transmitted by the wireless broadcast device. Each measurement location for the wireless measurement device 12a is indicated by a crosshair symbol. As seen in FIG. 2, a wireless broadcast device 12b is positioned on the opposite side of a feature in the map image relative to the measurement locations for the wireless measurement device 12b. Also seen in FIG. 2, a dashed line indicates the path between the wireless broadcast device 12b and the measurement location for the wireless measurement device 12a. A user may systematically position the wireless measurement device 12a and wireless broadcast device 12b at the locations shown by way of example in FIG. 2 and measure at these locations the signal strength of wireless signals transmitted by the wireless broadcast device. A user may select measurement locations based on areas at the site where wireless access may be desirable. For example, as shown in FIG. 2, wireless access may be desirable in the offices 38, conference room 40, cubicles 42, kitchen 44, and reception area 46; thus, in this example, the measurement locations are concentrated in these areas.

Physical structures 48, 50, 52, and 54 (e.g., walls, doors, cubicles, desks, etc.) in the example map image of FIG. 2 are shown intersecting the path between the wireless broadcast device 12b and the measurement locations for the wireless measurement device 12a. The attenuation determination system 18 advantageously analyzes signal strength measurements to determine the additional attenuation actually attributable to these physical structures. Accordingly, in the example shown, a respective attenuation value may be assigned to each of the walls 48, doors 50, cubicles 52, and desks 54 in the operating environment of the survey site. The attenuation profile in this example will therefore include information relating to the physical structures 48, 50, 52, and 54 present at the survey site and the additional attenuation attributable to those physical structures.

Figure 3:
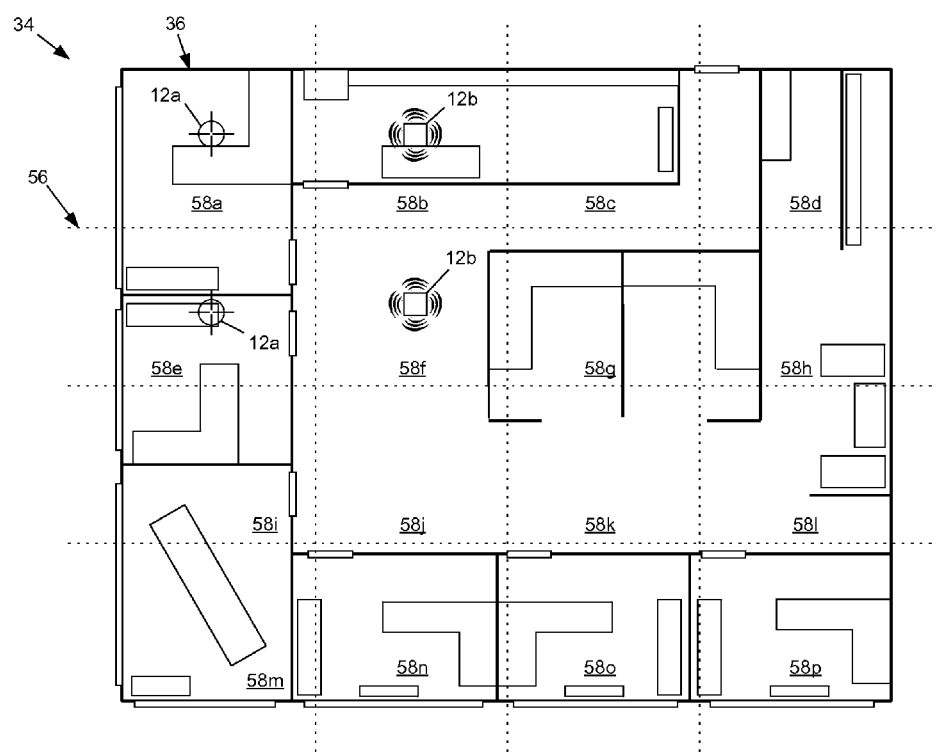
FIG. 3 is the example map image of FIG. 2 illustrating a second example approach to conducting a wireless site survey.

FIG. 3 is the same example map image 34 for the same survey site 36 as shown in FIG. 2 but illustrates the grid measurement approach for a wireless site survey discussed above. As seen in FIG. 3, the map image has been divided into a grid 56 of multiple cells 58. In this alternative approach, a user may iteratively position the wireless measurement device 12*a* (indicated in FIG. 3 with the crosshair symbols) and the wireless broadcast device 12*b* at various areas around the survey site 36 that correspond to the grid cells 58*a-p* to measure the signal strength of wireless signals transmitted by the wireless broadcast device 12*b*. The user may position the wireless measurements device 12*a* at a measurement location that corresponds to one of the grid cells 58 and position the wireless broadcast device 12*b* at a broadcast location that corresponds to a different grid cell. For example, as shown in FIG. 3, the wireless measurement device 12*a* is positioned at a measurement location in grid cell 58*a*, and the wireless broadcast device 12*b* is positioned at a different location in a different grid cell 58*b*. The wireless measurement device 12*a* in grid cell 58*a* may thus measure the strength of wireless signal broadcast by the wireless broadcast device 12*b* in grid cell 58*b*.

After the signal strength has been measured, the wireless measurement device 12*a* and the wireless broadcast device 12*b* may be positioned at a new measurement location and broadcast location respectively, the new locations corresponding to other cells of the grid. As shown in FIG. 3, for example, the wireless measurement device 12*a* has been positioned at a new measurement location in grid cell 58*e*, and the wireless broadcast device 12*b* has been positioned at a new broadcast location in grid cell 58*f*. In some example implementations, the locations may be chosen such that the wireless measurement device and the wireless broadcast device are positioned at locations corresponding to the respective centers of the grid cells.

A user may select any number and combination of measurement and broadcast locations to collect the signal strength measurements. In one example implementation, the user may position the wireless measurement device 12*a* at a measurement location in each of the grid cells 58 and successively position the wireless broadcast device 12*b* at broadcast locations in each of the other grid cells. Using the grid 56 in FIG. 3 as an example, a wireless measurement device may be positioned at a measurement location in grid cell 58*a*, and a wireless broadcast device may be successively positioned at broadcast locations in each of the other grid cells 58*b-p* during a first round of signal strength measurements. The wireless measurement device in grid cell 58*a* may thus take signal strength measurements from the wireless broadcast device at each of the respective broadcast locations in grid cells 58*b-p*. Next, the wireless measurement device may be positioned in a new grid cell such as grid cell 58*b* in this example. Like before, the wireless broadcast device may be successively positioned at broadcast locations in each of the other grid cells 58*a* and 58*c-p* during a second round of signal strength measurements. The wireless site survey, in this example, may continue in this fashion until a measurement location in each grid cell has been paired with a broadcast location in each of the other grid cells. As mentioned above, any combination of measurement and broadcast locations suitable to provide enough signal strength measurements for an accurate attenuation profile may be selectively employed.

The attenuation determination system 18 may determine the attenuation observed at each of the grid cell areas of the survey site 36, respectively calculate additional attenuation values for each grid cell, and respectively assign additional attenuation values to the grid cells 58 of the grid 56. The attenuation profile in this alternative example will therefore include information relating to the grid 56, the number and size of the grid cells 58, and the additional attenuation respectively assigned to each grid cell.

The two example wireless site survey approaches discussed above may be used when the pair of wireless devices 12*a* and 12*b* include a wireless measurement device and access point (i.e., one user) as well as when the pair of wireless devices each serves as a wireless measurement device and a wireless broadcast device as discussed above (i.e., two users). In the latter implementation, each of the two users of the wireless devices 12*a* and 12*b* may operate one of the wireless devices. Each wireless device may display a map image of the site under survey that each user can respectively indicate measurement locations upon. The two users may move throughout the survey site 36 positioning themselves and the wireless devices 12*a* and 12*b* on opposite sides of physical structures 48-54 in the operating environment and measuring the respective signals strengths transmitted by each of the wireless devices 12*a* and 12*b*. The first user may use the attenuation determination system 18 at the first wireless device 12*a* to measure the signal strengths of wireless signals transmitted by the second wireless device 12*b*, and the second user may use the attenuation determination system 18 at the second wireless device to measure the signal strengths of wireless signals transmitted by the first wireless device.

In this way, each attenuation determination system 18 may compile signal strength information from each of the wireless devices 12*a* and 12*b*. The information compiled by each attenuation determination system 18 of the wireless devices 12*a* and 12*b* may be collected and used to determine the attenuation profile for the survey site 36. In some implementations, one of the wireless devices 12*a* and 12*b* may transmit the location information and related signal strength information compiled during the wireless site survey to the corresponding wireless device so that the data may be stored at a single device.

Figure 4:
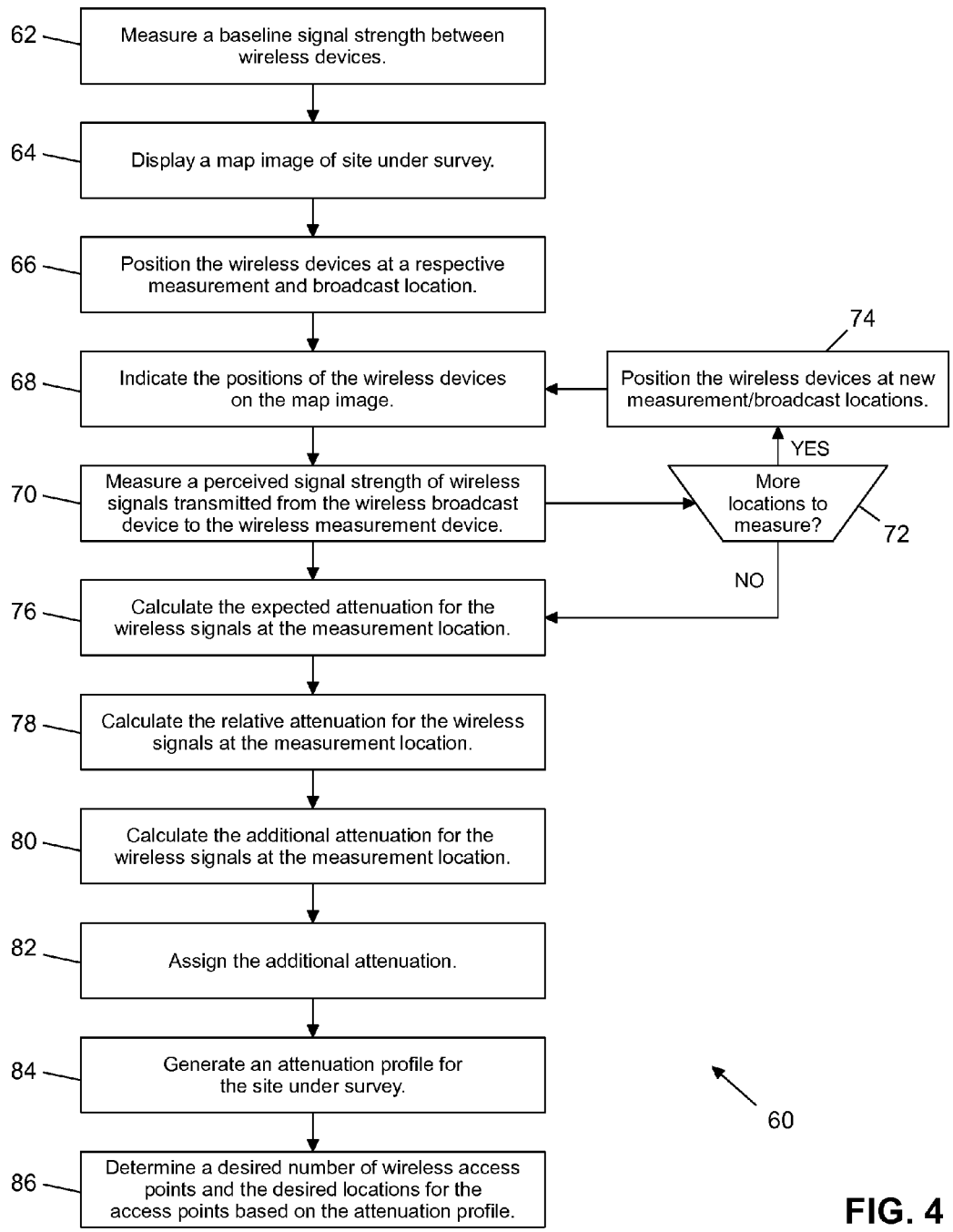
FIG. 4 is a flowchart of example method steps for conducting a wireless site survey using an attenuation determination system.

In FIG. 4, a flowchart 60 of example method steps for conducting a wireless site survey using the attenuation determination system is shown. First, a baseline signal strength is measured between the wireless devices (step 62). The wireless measurement device may measure the baseline signal strength while the wireless measurement device is associated with or not associated with the wireless broadcast device. The wireless measurement device may store the baseline signal strength in a memory unit as, for example, an RSSI value. A map of the site under survey is displayed (step 64). The wireless measurement device is positioned at a measurement location and the wireless broadcast device is positioned at a broadcast location at the site under survey (step 66). As discussed above, the measurement location and the broadcast location may be chosen such that a physical structure is positioned between the wireless measurement device and the wireless broadcast device. Alternatively, the measurement location and broadcast location may be chosen such that the locations correspond to cells in a grid for the site under survey. Further, in some implementations, the wireless broadcast device may be a wireless access point or wireless tag and in other implementations each wireless device may serve as both a wireless measurement device and wireless broadcast device such that each wireless device includes an attenuation determination system. Where both wireless devices serve as a wireless measurement device and a wireless broadcast device, the chosen locations are thus both a measurement location and a broadcast location.

The respective positions of the wireless devices are indicated on the map (step 68). A scale for the map image may also be received that scales a distance at the survey site to a distance in the map image. The wireless measurement device may then measure a perceived signal strength of wireless signals transmitted from the wireless broadcast device to the wireless measurement device (step 70). The wireless measurement device may measure the perceived signal strength while the wireless measurement device is associated with or not associated with the wireless broadcast device. Where each wireless device includes an attenuation determination system, both wireless devices may measure respective perceived signal strengths of wireless signals exchanged between the wireless devices. If there are more locations to measure at the site under survey (step 72), then the one or both of the wireless devices may be positioned at new measurement and broadcast locations respectively (step 74) and steps 68-72 may be repeated.

Once a sufficient number of perceived signal strength measurements have been taken, the attenuation values for the measurement locations may be determined. An expected attenuation for the wireless signals at the measurement location is calculated (step 76). The expected attenuation may be calculated using, for example, the free space loss formula set forth in equation (1) above. The relative attenuation for the wireless signals at the measurement location is also calculated (step 78). Relative attenuation may be calculated by subtracting the perceived signal strength from the baseline signal strength as set forth in equation (2) above. The additional attenuation is calculated (step 80) by subtracting the expected attenuation from the relative attenuation as set forth in equation (3) above.

Once the additional attenuation has been calculated, it may be assigned (step 82). As discussed above, the additional attenuation may be assigned to features in the map image that correspond to physical structures at or particular areas of the survey site. The additional attenuation may be assigned to the features in the map image manually or automatically.

An attenuation profile for the site under survey may be generated (step 84). The attenuation profile may include information regarding the signal strength measurements, calculated attenuation values, physical structures in the operating environment of the survey site, etc. The attenuation profile may be analyzed to determine a desired number of wireless access points and the desired locations for the access points to provide adequate network coverage and quality of service (step 86). The attenuation profile for the survey site may be advantageously transmitted to a professional network design service that can remotely analyze the attenuation profile for the site and provide recommendations for the network design. Thus, the accuracy of the attenuation profile is enhanced and the costs of conducting a wireless site survey are reduced.

It will be understood and appreciated that one or more of the processes, sub-processes, and process steps described in connection with FIG. 1 and FIG. 4 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIG. 1. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., an attenuation determination system 18 in FIG. 1), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for surveying a site for installation of wireless access points comprising:
    displaying a map of the site under survey;
    analyzing the map to automatically identify one or more features of the map that respectively correspond to at least one physical structure at the site under survey;
    receiving user input relating to a first position of a first wireless device at the site;
    receiving user input relating to a second position of a second wireless device at the site;
    measuring, using the first wireless device, one or more wireless signals broadcast by the second wireless device to obtain respective signal strength values corresponding to the strength of the wireless signals;
    calculating one or more attenuation values based on the one or more signal strength values; and
    respectively assigning at least one of the attenuation values to the identified features of the map of the site under survey.

2. The method of claim 1 further comprising:
    analyzing the one or more attenuation values to identify a corresponding wireless coverage pattern for the second wireless device at the site under survey;
    determining an amount of wireless access points for installation at the site based on the wireless coverage pattern; and
    determining respective installation locations at the site under survey for the wireless access points based on the wireless coverage pattern.

3. The method of claim 1 further comprising:
    obtaining a baseline signal strength value using the first wireless device from a first location where the first location relative to the second wireless device; and
    obtaining a perceived signal strength value using the first wireless device from a second location that is different from the first location.

4. The method of claim 3 further comprising:
    determining free space path loss at the site under survey to obtain an expected attenuation value;
    calculating a relative attenuation value by subtracting the perceived signal strength value from the baseline signal strength value; and
    calculating an additional attenuation value by subtracting the expected attenuation value from the relative attenuation value.

5. The method of claim 4 further comprising:
    automatically determining that one of the identified features of the map intersects a path between the first wireless device and the second wireless device; and
    automatically assigning the additional attenuation value to the feature of the map that intersects the path between the first wireless device and the second wireless device.

6. The method of claim 4 further comprising:
    dividing the map of the site under survey into a grid having a plurality of grid cells; and
    assigning the additional attenuation value with one of the grid cells.

7. The method of claim 4 further comprising generating an attenuation profile for the site under survey that includes one or more additional attenuation values respectively assigned to one or more features of the map.

8. The method of claim 1 where the first wireless device is a wireless measurement device and the second wireless device is a wireless access point.

9. The method of claim 1 further comprising measuring, using the second wireless device, one or more signal strength values respectively assigned to one or more wireless signals broadcast by the first wireless device.

* * * * *